(No Model.)
J. SMITH.
POST OR POLE.
No. 321,543.  Patented July 7, 1885.
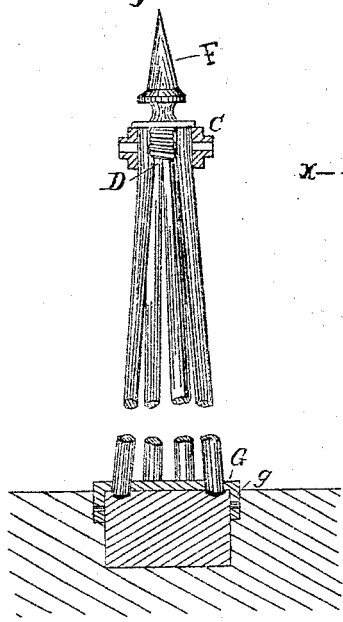
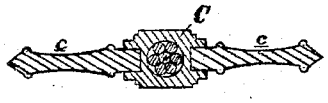
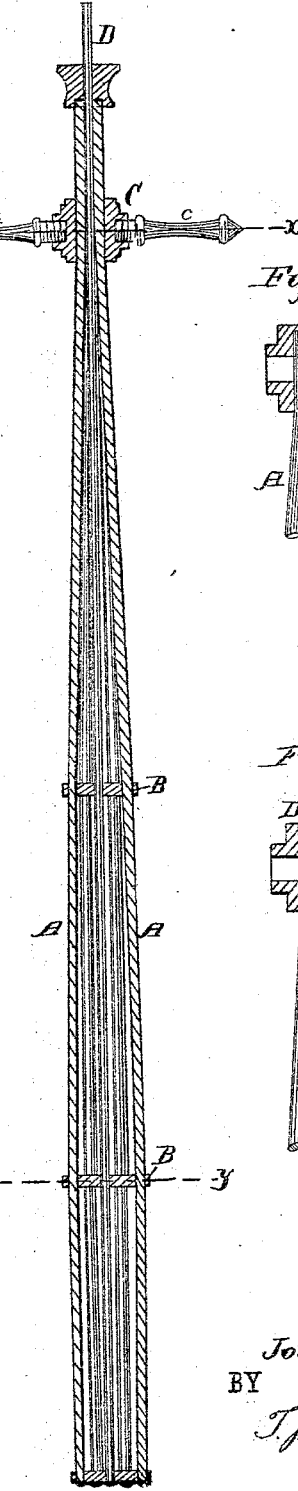
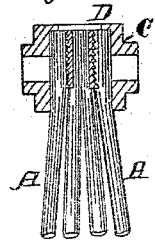
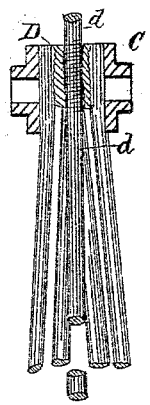
WITNESSES:
W. T. Robertson
E. H. Bond
INVENTOR
Joseph Smith
BY
T. W. Robertson
ATTORNEY

United States Patent Office.

JOSEPH SMITH, OF OTTAWA, ONTARIO, CANADA.

POST OR POLE.

SPECIFICATION forming part of Letters Patent No. 321,543, dated July 7, 1885.

Application filed July 11, 1884. (No model.)

*To all whom it may concern:*

Be it known that I, JOSEPH SMITH, a subject of the Queen of Great Britain, residing at Ottawa, in the Province of Ontario, Canada, have invented certain new and useful Improvements in Posts or Poles, of which the following is a specification, reference being had therein to the accompanying drawings.

This invention relates to an improvement in posts designed for telegraph and signal poles, lamp, hitching, and fence posts, and other analogous articles; and the invention consists in the peculiar combination and construction and arrangement of parts hereinafter more particularly described and claimed.

In the accompanying drawings, Figure 1 is shows a side elevation of a lamp-post constructed according to my improvement; Fig. 2, a vertical central section of the same; Fig. 3, a similar section of the top and bottom of a fence-post. Fig. 4 is a horizontal section through line $x\,x$, Fig. 2. Fig. 5 is a horizontal section through line $y\,y$ in same figure. Figs. 6 and 7 show sectional details.

Referring now to the details of the drawings, A A represent a series of rods of any appropriate shape, although I have shown round ones, each of which passes through rings or plates B, each plate being provided with appropriate holes or recesses to receive and hold the rods, the bottoms of which are preferably riveted to the bottom plate; but they may be fastened in any other suitable manner. Near the top of the rods is a collar, C, which may be either circular inside or may have shallow recesses to receive the outer sides of the rods. This collar is preferably of such shape and size as to cause the rods to approach each other, leaving a space in the center into which a pipe or tube or plug, D, may be fitted, as hereinafter described, which forms a key to bind the whole fast together.

If the post is intended for a gas-lamp, or an electric light, or to be used as a telegraph-pole, I prefer to make the key in the form of a gas-pipe of the appropriate size, as shown in Figs. 1 and 2, through which the gas may be conveyed to the lamp above; or the electric wires may pass through it from underground conduits. This central pipe or tube may be placed in the center before the collar C is driven on; or the collar may be placed on first, and then the central pipe driven through to tighten the rods in the collar. To make it operate the better in this respect, I sometimes slightly taper the top of the pipe.

Instead of using a long pipe running the whole length of the post, I sometimes use a short pipe or thimble, as shown in Fig. 6, which may be screw-threaded on the outside to fit a female thread which may be cut in the aperture formed by the junction of the rods A A. Through this thimble a smaller gas-pipe, an electric conductor, or other object may be passed. I sometimes make internal threads in such thimbles, into which tubes $d$ may be screwed, as shown in Fig. 7.

When I am constructing a fence-post, I make the top as shown in Fig. 3, in which F represents an ornamental top provided with a screw, D, which is screwed into the central space between the tops of the rods, which are tapped for the purpose, as before described in reference to Fig. 5.

I prefer to make the posts long enough to sink the lower portion into the ground; but for fence-posts I sometimes use a plate, G, at the bottom, having flanges $g$, as shown in Fig. 3, so as to bolt or otherwise secure it to a block of wood or other material set in the ground.

I generally make the ring or plates in which I secure the rods with a cross-bar, $b$, as shown in Fig. 5, having a central opening for the pipe; but I do not regard this as essential in all cases, and I may sometimes omit it, especially where the post is short.

I do not limit myself to the use of round rods, as shown, as it is evident that other shaped iron may be used; nor do I limit myself to the number of rods, as they may be varied. In some cases I may substitute gas-pipes for the rods. The collar C may be provided with lugs, into which holes may be bored to receive the arms $c$ on the lamp-post, or the arms may be cast with said collar, as desired. When the collar is designed to be used on a fence-post, the holes in the collar may be used to receive the horizontal bars of the fence. By this construction it will be seen that I can make a very strong post at a comparatively cheap rate, that may be used for a great variety of purposes.

What I claim as new is—

1. The combination, in a post, pole, or other analogous article, of the rods A, the collar C, and a key set in the center of the rods, substantially as described.

2. The combination, in a post, pole, or other analogous article, of the rods A, the collar C, and a key screwed into the center of the rods, substantially as described.

3. The combination, in a post, pole, or analogous article, of the rods A, the collar C, and the hollow key set in the center of the rods, substantially as described.

4. As a new article of manufacture, a post formed of a series of rods, A, passing through apertures in a plate, B, and entering a collar, C, where it is held by a central key, D, substantially as described.

In testimony whereof I affix my signature, in presence of two witnesses, this 3d day of July, 1884.

JOSEPH SMITH.

Witnesses:
A. W. FRASER,
F. T. POWELL.